US008549339B2

(12) United States Patent
Wolfe et al.

(10) Patent No.: US 8,549,339 B2
(45) Date of Patent: Oct. 1, 2013

(54) PROCESSOR CORE COMMUNICATION IN MULTI-CORE PROCESSOR

(75) Inventors: Andrew Wolfe, Los Gatos, CA (US);
Marc Elliot Levitt, San Jose, CA (US)

(73) Assignee: Empire Technology Development LLC, Wilmington, DE (US)

( * ) Notice: Subject to any disclaimer, the term of this patent is extended or adjusted under 35 U.S.C. 154(b) by 524 days.

(21) Appl. No.: 12/713,220

(22) Filed: Feb. 26, 2010

(65) Prior Publication Data

US 2011/0213991 A1     Sep. 1, 2011

(51) Int. Cl.
*G06F 1/08* (2006.01)
*G06F 1/32* (2006.01)

(52) U.S. Cl.
USPC ........................... 713/322; 713/320; 713/501

(58) Field of Classification Search
None
See application file for complete search history.

(56) References Cited

U.S. PATENT DOCUMENTS

| | | | |
|---|---|---|---|
| 6,711,447 B1 | 3/2004 | Saeed | |
| 7,219,245 B1 | 5/2007 | Raghuvanshi | |
| 7,248,838 B2* | 7/2007 | Goodnow et al. | 455/70 |
| 7,263,457 B2 | 8/2007 | White et al. | |
| 7,735,037 B2 | 6/2010 | Tell | |
| 7,853,808 B2 | 12/2010 | Kim et al. | |
| 8,225,315 B1* | 7/2012 | Cheng et al. | 718/1 |
| 2009/0106576 A1* | 4/2009 | Jacobowitz et al. | 713/501 |
| 2009/0138737 A1* | 5/2009 | Kim et al. | 713/322 |
| 2010/0162018 A1* | 6/2010 | Subramanian et al. | 713/322 |
| 2010/0188115 A1* | 7/2010 | von Kaenel | 326/16 |

OTHER PUBLICATIONS

Notification of Transmittal of the International Search Report and the Written Opinion of the International Searching Authority, May 17, 2011.

Joonho Kong et al "Low-Cost Application-Aware DVFS for Multi-Core Architecture", Third 2008 International Conference on Convergence and Hybrid Information Technology, IEEE Computer Society, 2008, pp. 106-111.

Reinaldo Bergamaschi et al., "Exploring Power Management in Multi-Core Systems", IEEE, 2008, pp. 708-713 (Downloaded on Jul. 13, 2009 from IEEE Xplore).

Wayne H. Cheng et al "Dynamic Voltage and Frequency Scaling Circuits with Two Supply Voltages", IEEE, 2008, pp. 1236-1239 (Downloaded on Jul. 14, 2009 from IEEE Xplore).

Wonyoung Kim et al "System Level Analysis of Fast, Per-Core DVFS using On-Chip Switching Regulators", High Performance Computer Architecture, IEEE 14th International Symposium, Feb. 16-20, 2008, pp. 123-134.

Howlett-Packard Corporation et al., "Advanced Configuration and Power Interface Specification", Oct. 10, 2006, pp. 1-631 (represented by 4 different files), Revision 3.0b.

Micah Schmidt, "Nehalem: Xeon Gets Core i7 Upgrade", 2CPU.com, Mar 29, 2009 <http://www.2cpu.com/review.php?id=117>.

"Third-Generation AMD Opteron Processor Key Architectural Features", Waybackmachine, Oct. 20, 2007 <http://www.amd.com/us-en/Processors/ProductInformation/0,,30_118_8796_15224,00.html>.

* cited by examiner

*Primary Examiner* — Dennis M Butler

(74) *Attorney, Agent, or Firm* — Ren-Sheng International

(57) ABSTRACT

Embodiments of the disclosure generally set forth techniques for handling communication between processor cores. Some example multi-core processors include a first set of processor cores in a first region of the multi-core processor configured to dynamically receive a first supply voltage and a first clock signal, a second set of processor cores in a second region of the multi-core processor configured to dynamically receive a second supply voltage and a second clock signal, and an interface block coupled to the first set of processor cores and the second set of processor cores, wherein the interface block is configured to facilitate communications between the first set of processor cores and the second set of processor cores.

23 Claims, 5 Drawing Sheets

500 A computer program product 502 at least one of one or more instructions for receiving a request of changing the clock frequency;

one or more instructions for issuing a command to idle communication with the first region;

one or more instructions for examining whether a first phase lock loop operation associated with the first region has acquired a first lock signal in response to the request; and/or one or more instructions for examining whether a second phase lock loop operation associated with a second region of processor cores in the multi-core processor has acquired a second lock signal in response to the request, wherein the second region is adjacent to the first region

| 504 a signal bearing medium | 506 a communication medium |

| 508 a computer readable medium | 510 a recordable medium |

FIG. 5

PROCESSOR CORE COMMUNICATION IN MULTI-CORE PROCESSOR

BACKGROUND OF THE DISCLOSURE

A multi-core processor includes two or more independent processor cores arranged in an array. Each processor core in a conventional multi-core processor generally shares the same supply voltage and clock signal to simplify the interfaces between the processor cores. For power consumption management, dynamic supply voltage and clock speed control may be utilized, so that a multi-core processor may operate at high power and high clock frequency when needed and at low power when the computing requirements are reduced.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

FIG. 5 is a block diagram illustrating an example computer program product for handling processor core communication in a multi-core processor; all arranged in accordance with at least some embodiments of the present disclosure.

DETAILED DESCRIPTION

Figure 1:
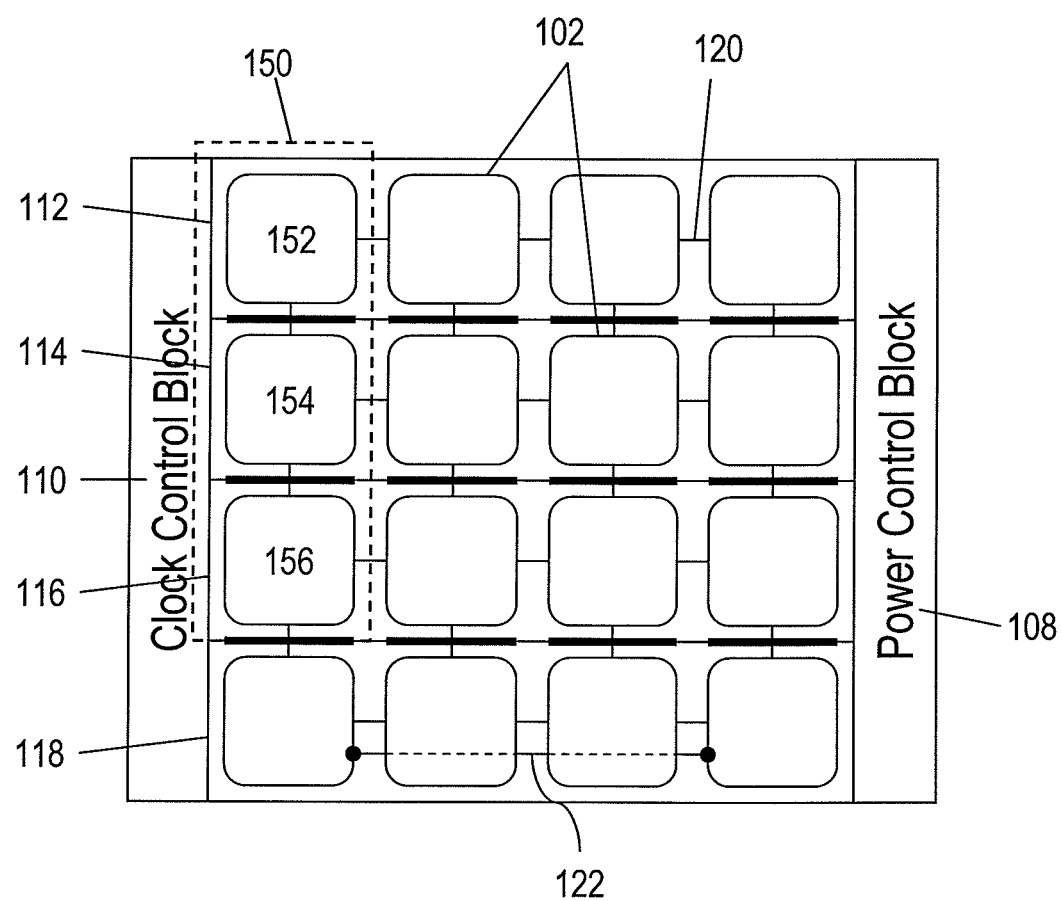
FIG. 1 illustrates an example configuration of a multi-core processor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to devices, methods, systems, and computer programs related to power management for a multi-core processor.

A multi-core processor may include multiple processor cores arranged in an array. A power profile associated with an individual processor core may be controlled through signals that may be received from control blocks that are located in the periphery of the multi-core processor. The power profile may include, without limitation, one or more power-supply voltages of the core processor, clock rates of the core processor, clock multipliers of the core processor, power throttling of the core processor, and/or sleep state cycles of the core processor.

FIG. 1 illustrates an example configuration of a multi-core processor 100 that is arranged in accordance with at least some embodiments of the present disclosure. The multi-core processor 100 may include multiple processor cores 102 arranged in rows and columns in a 2-dimensional array in an integrated circuit. A processor core may be coupled with adjacent processor cores through an interface circuit 120. In some implementations, the processor cores 102 may be horizontally coupled to one another, vertically coupled to one another, and/or diagonally coupled to one another by the interface circuit 120. In some example implementations, the processor core 102 located on one edge of the multi-core processor 100 may also be coupled to the processor core 102 on the opposite edge with a wrap-around connection 122, which may be employed to ensure a continuous connection among the processor cores in the same row and/or column.

The multi-core processor 100 may be further divided into regions. In some implementations, the regions of multi-core processor 100 may correspond to rows of the two-dimensional array, and the regions may or may not be overlapping. Each row of processors may also be referred to as a "stripe." For example, the multi-core processor 100 may be divided into stripes 112, 114, 116, and 118. Each stripe may be associated with an independent power profile. For example, the stripe 112 may be powered by a supply voltage received from a power control block 108 and/or may be associated with an independent clock domain defined by a clock signal received from a clock control block 110. In some implementations, the power control block 108 and the clock control block 110 may be arranged at two different sides of the multi-core processor 100 as shown in FIG. 1. In some other implementations, the power control block 108 and the clock control block 110 may be arranged at the same side of the multi-core processor 100. In yet some other implementations, the power control block 108 and the clock control block 110 may be arranged in a common area located near the center of the multi-core processor 100.

The power profile associated with a stripe may be determined based on the computational requirements of the tasks assigned to the processor cores in the stripe. In some implementations, sensors placed at the input of each processor core may be configured to measure the supply voltage and the local temperature for the processor core. The measured supply voltage and local temperature may be maintained in the power control block 108. One or more performance counters associated with each processor core may also provide feedback to the power control block 108. Based on the measured operational information (e.g., supply voltage and local temperature) and the performance data, the power control block 108 may then be configured to select a supply voltage for each strip. For example, the tasks with the highest computational requirements may be scheduled into the topmost stripe, such as the stripe 112. The stripe 112 may be configured to operate at a high supply voltage. The tasks with lesser computational requirements may be scheduled into the stripe 114 and so forth. The stripes 114, 116, and 118 thus may be configured to operate lower supply voltages.

In some implementations, supply voltages to the stripes may be selected such that the selected supply voltages for adjacent stripes may differ by a limited amount. This limited amount may be based on a relationship between the output voltage level associated with one stripe and the input voltage level associated with an adjacent stripe. For example, suppose the stripe with the higher supply voltage (e.g., the stripe 112)

may be associated with an output voltage level (e.g., $V_o$). $V_o$ needs to fall reliably within an acceptable input voltage level range (e.g., $V_{i+}$ to $V_{i-}$) for an adjacent stripe (e.g., the stripe 114). In other words, the power control block 108 may be configured to select the supply voltages to the stripe 112 and the stripe 114, so that the aforementioned relationship between $V_o$ and range $V_{i+}$ to $V_{i-}$ may be maintained.

To maintain the limited differential relationship discussed above, adjusting the supply voltage to one stripe may involve adjusting the supply voltages to the other stripes. To illustrate, suppose the power control block 108 may adjust the supply voltage to the stripe 112. To maintain the limited differential relationship, the power control block 108 may adjust the supply voltages to the stripes 118, 116, and 114 before adjusting the supply voltage to the stripe 112.

Although dynamically adjusting the power profile for a stripe in response to changes in computational requirements may reduce power consumption for a multi-core processor, such adjustments may take some period of time to stabilize. To further illustrate the interfaces that facilitate communication between two processor cores in the multi-core processor 100, a subset 150 of processor cores 152, 154, and 156 of FIG. 1 may be selected. The processor core 152 belongs to the stripe 112; the processor core 154 belongs to the stripe 114; and the processor core 156 belongs to the stripe 116.

Figure 2:
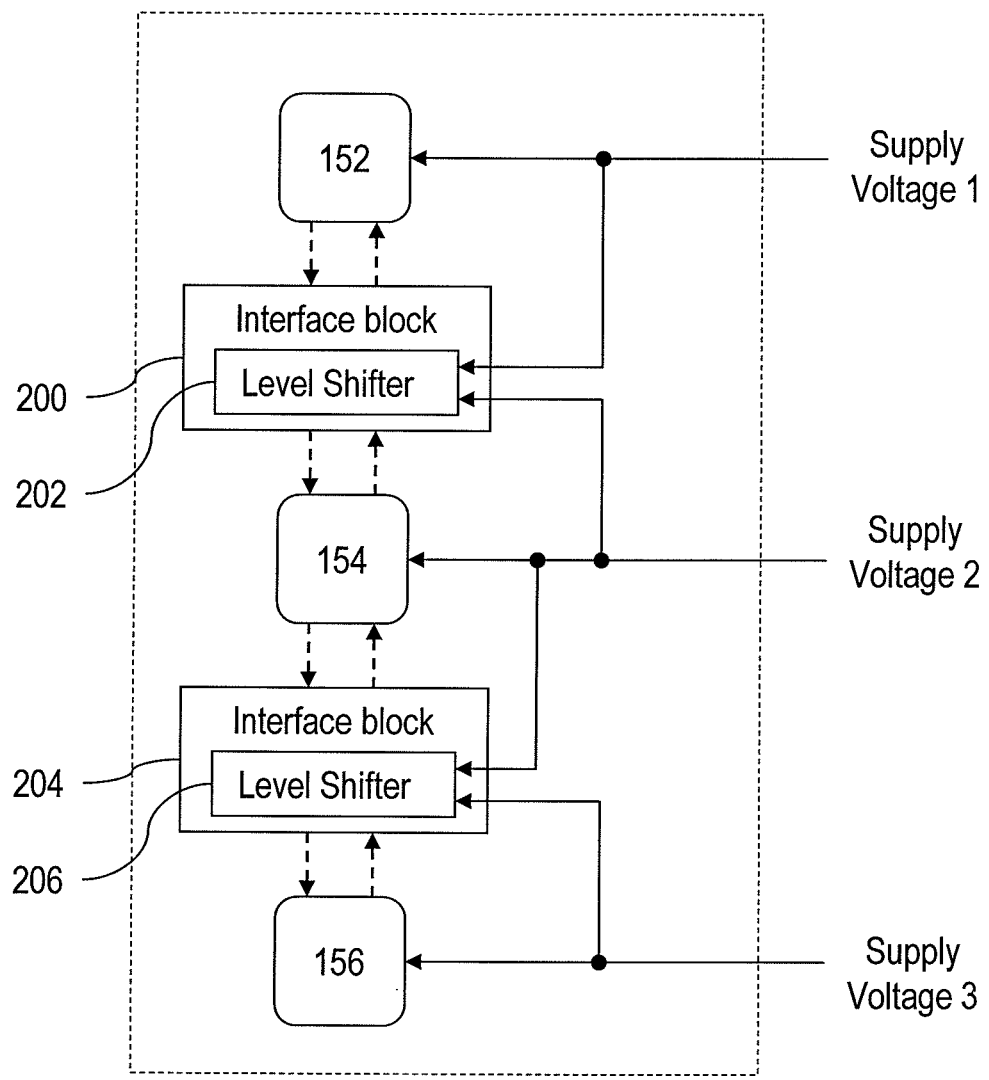
FIG. 2 is a block diagram illustrating an example set of processor cores with example interface blocks having level shifters.

FIG. 2 is a block diagram illustrating an example subset 150 of processor cores with example interface blocks having level shifters, arranged in accordance with at least some embodiments of the present disclosure. The processor core 152 may be powered by a supply voltage 1 and coupled to an interface block 200 having a level shifter 202; the processor core 154 may be powered by a supply voltage 2 and coupled to the same interface block 200; and the processor core 156 may be powered by a supply voltage 3 and coupled to an interface block 204 having a level shifter 206. In some implementations, the inputs of the level shifter 202 may be the supply voltage 1 and the supply voltage 2, and the inputs of the level shifter 206 may be the supply voltage 2 and the supply voltage 3. The supply voltage 1, the supply voltage 2, and the supply voltage 3 may come from a power control block, such as the power control block 108 of FIG. 1.

When the processor core 152 of the stripe 112 sends a signal to the processor core 154 of the stripe 114, in some implementations, the output voltage of the level shifter 202 may be tied to the supply voltage 2, and the input voltage of the level shifter 202 may be tied to the supply voltage 1. The level shifters are arranged to translate the signal levels such that each of the processor cores operates correctly (e.g., the processor cores properly interpret the voltages as valid logic levels even though processor cores are powered by different supply voltages). Here, the level shifter 202 may be adapted to translate first logic levels associated with the stripe 112 to second logic levels associated with the stripe 114, and the level shifter 202 may be referenced to the supply voltage 2. On the other hand, when the processor core 154 of the stripe 114 sends a signal to the processor core 152 of the stripe 112, the output voltage of the level shifter 202 may be tied to the supply voltage 1, and the input voltage of the level shifter 202 may be tied to the supply voltage 2. In other words, the level shifter 202 may be adapted to translate second logic levels associated with the stripe 114 to first logic levels associated with stripe 112, and the level shifter 202 may be referenced to the supply voltage 1. The relationships among the supply voltage 1, supply voltage 2, and the level shifter 202 described above similarly apply to the relationships among the supply voltage 2, supply voltage 3, and the level shifter 206.

Figure 3:
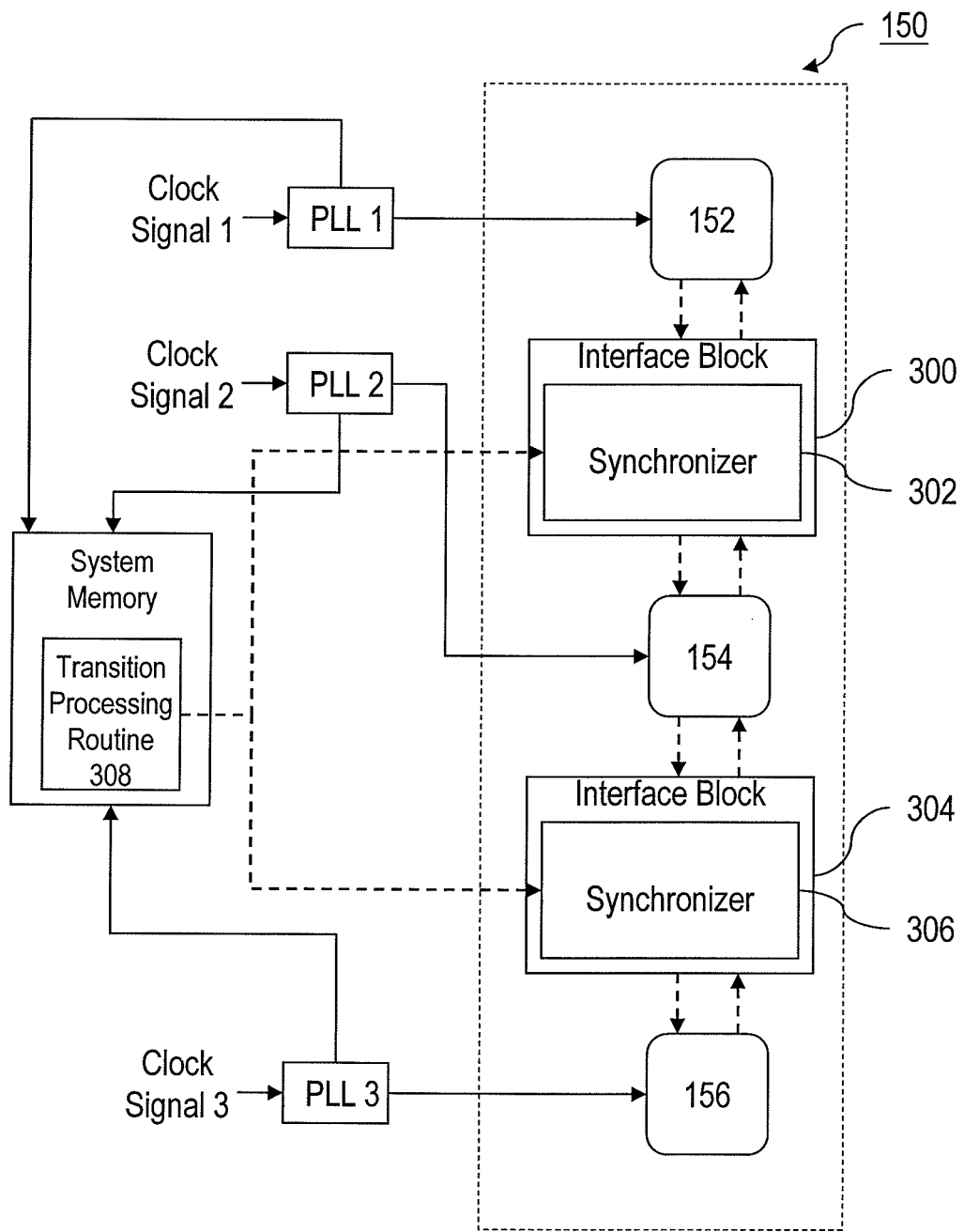
FIG. 3 is another block diagram illustrating an example set of processor cores with example interface blocks having synchronizers.

FIG. 3 is another block diagram illustrating an example subset 150 of processor cores with example interface blocks having synchronizers, arranged in accordance with at least some embodiments of the present disclosure. The processor core 152 may be driven by a clock signal 1 and coupled to an interface block 300 having a synchronizer 302; the processor core 154 may be driven by a clock signal 2 and coupled to the same interface block 300; and the processor core 156 may be driven by a clock signal 3 and coupled to an interface block 304 having a synchronizer 306. In some implementations, the clock signal 1, the clock signal 2, the clock signal 3, and the respective phase lock loops (PLLs) may be a part of a clock control block, such as the clock control block 110. The processing results of the PLL blocks may be fed back to a transition processing routine 308. Commands generated by the transition processing routine 308 may also be sent to the synchronizer 302 and/or the synchronizer 306.

Figure 4:
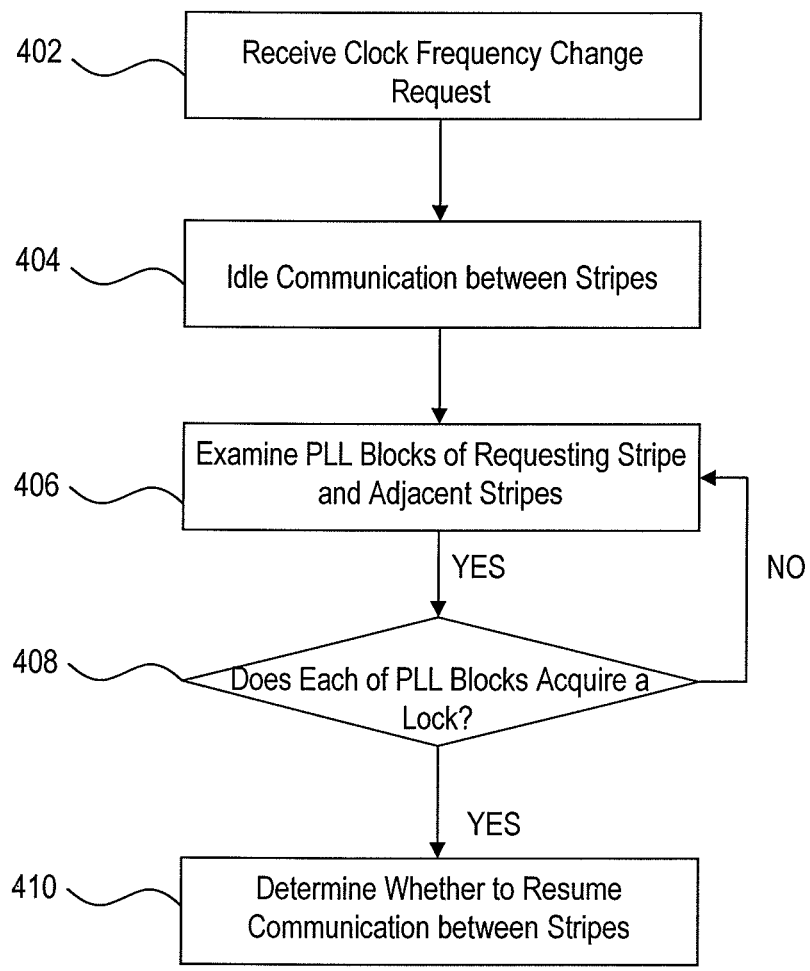
FIG. 4 is a flow chart illustrating an example transition processing routine for managing a clock frequency change.

As discussed above, when the power profile for a stripe changes, such as a change in clock frequency, the clock signal for the stripe may become unstable. To handle such a situation, FIG. 4 is a flow chart illustrating an example transition processing routine 400 for managing a clock frequency change, arranged in accordance with at least some embodiments of the present disclosure. For ease of description, the transition processing routine 400 is described in terms of a set of processor cores and interface blocks substantially similar to those described previously with respect to FIG. 3. The transition processing routine 400 may include one or more functions, operations, or actions as depicted by operations 402, 404, 406, 408, and/or 410. In some implementations, the various features of the illustrated operations for the transition processing routine 400 may be combined into fewer operations, divided into additional operations, or eliminated based on the desired result.

Processing for the transition processing routine 400 may begin at operation 402, "receive clock frequency change request." Operation 402 may be followed by operation 404, "idle communication between stripes." Operation 404 may be followed by operation 406, "examine PLL blocks of requesting stripe and adjacent stripe(s)." Operation 406 may be followed by operation 408, "does each of PLL blocks acquire a lock?" Operation 408 may be followed by either operation 406 when the decision logic tested at block 408 fails to be satisfied (NO), or operation 410, "determine whether to resume communication between stripes", when the decision logic tested at block 408 is satisfied (YES). Processing for the routine may terminate after block 410.

For illustration, suppose the processor core 154 of the stripe 114 in FIG. 3 is asked to change its clock frequency based on the tasks that are being assigned to the stripe 114 for processing. After having received the request in operation 402, the transition processing routine 400 may issue commands to the synchronizer 302 and the synchronizer 306 in operation 404 to idle the communications between the processor core 154 and the processor core 152 and between the processor core 154 and the processor core 156. Following operation 404, the outputs of the PLL blocks for the stripes that are adjacent to the stripe 114 may be examined in operation 406. Depending on whether the PLL blocks have acquired locks as determined in operation 408, the transition processing routine 400 may decide in operation 410 whether the transition sequence has occurred properly and the communication between the stripes may resume.

In some implementations, after each of the PLL block 1, PLL block 2, and PLL block 3 is determined to have acquired a lock of its respective clock signal in operation 408, a stable clock signal may be sent to the processor core 154 and also the synchronizer 302 and the synchronizer 306. Then, the synchronizer 302 may be configured to synchronize the clock signal 1 and the clock signal 2 for the communication between the processor core 152 and the processor core 154. Similarly, the synchronizer 306 may be configured to synchronize the clock signal 2 and the clock signal 3 for the communication between the processor core 154 and the processor core 156.

FIG. 5 is a block diagram illustrating a computer program product 500 for handling processor core communication in a multi-core processor in accordance with at least some embodiments of the present disclosure. Computer program product 500 may include one or more sets of executable instructions 502 for executing the transition processing routine described above and illustrated in FIG. 4. Computer program product 500 may be transmitted in a signal bearing medium 504 or another similar communication medium 506. Computer program product 500 may also be recorded in a computer readable medium 508 or another similar recordable medium 510.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link and/or channel, a wireless communication link and/or channel, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes"

should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A multi-core processor, comprising:
   a first set of processor cores of the multi-core processor, wherein each processor core from the first set of processor cores is configured to dynamically receive a first supply voltage and a first output clock signal of a first phase lock loop (PLL) having a first clock signal as input;
   a second set of processor cores of the multi-core processor, wherein each processor core from the second set of processor cores is configured to dynamically receive a second supply voltage and a second output clock signal of a second PLL having a second clock signal as input, wherein the first supply voltage is independent from the second supply voltage, and the first clock signal is independent from the second clock signal; and
   an interface block coupled to the first set of processor cores and also coupled to the second set of processor cores, wherein the interface block is configured to facilitate communication between the first set of processor cores and the second set of processor cores.

2. The multi-core processor of claim 1, wherein the interface block further comprises a first level shifter that is referenced to the second supply voltage and adapted to translate first logic levels associated with the first set of processor cores to second logic levels associated with the second set of processor cores for a first signal traveling from the first set of processor cores to the second set of processor cores.

3. The multi-core processor of claim 1, wherein the interface block further comprises a second level shifter that is referenced to the first supply voltage and adapted to translate second logic levels associated with the second set of processor cores to first logic levels associated with the first set of processor cores for a second signal traveling from the second set of processor cores to the first set of processor cores.

4. The multi-core processor of claim 1, wherein the interface block further comprises a synchronizer configured to synchronize the first clock signal and the second clock signal for communication between one or more processor cores of the first set of processor cores and one or more processor cores of the second set of processor cores.

5. The multi-core processor of claim 1, wherein the first set of processor cores and the second set of processor cores are configured to receive one or more control signals from one or more control blocks located in a periphery of the multi-core processor.

6. The multi-core processor of claim 5, wherein the first set of processor cores is adjacent to the second set of processor cores, and the one or more control blocks are configured to select the first supply voltage and the second supply voltage to maintain a differential relationship between the first supply voltage and the second supply voltage.

7. The multi-core processor of claim 6, wherein the differential relationship is based on having an output voltage level associated with the first set of processor cores to be within an acceptable input voltage level associated with the second set of processor cores.

8. The multi-core processor of claim 1, wherein the first set of processor cores are located in a first region of the multi-core processor, and the second set of processor cores are located in a second region of the multi-core processor.

9. The multi-core processor of claim 8, wherein the first region and the second region are overlapping regions of the multi-core processor.

10. The multi-core processor of claim 8, wherein the first region and the second region are non-overlapping regions of the multi-core processor.

11. The multi-core processor of claim 8, wherein the first region corresponds to a first row of the multi-core processor, and wherein the second region corresponds to a second row of the multi-core processor.

12. The multi-core processor of claim 1, wherein the interface block is configured to idle communications between the first set of processor cores and the second set of processor cores when one or more of the first output clock signal and/or the second output clock signal is determined to have changed.

13. The multi-core processor of claim 12, wherein the interface block is configured to resume communication between the first set of processor cores and the second set of processor cores after one or more of the first output clock signal and/or the second output clock signal is determined to have stabilized.

14. The multi-core processor of claim 1, wherein the first set of processor cores and the second set of processor cores are configured to receive one or more control signals from one or more control blocks located in a common region that is substantially central to the first set of processor cores and the second set of processor cores.

15. A method for managing communications in a multi-core processor that includes a plurality of processor cores having a first set of processor cores and a second set of processor cores, the method comprising:
   idling communications between the first set of processor cores and the second set of processor cores in response to a clock frequency change request for the first set of processor cores; and
   resuming communications between the first set of processor cores and the second set of processor cores after having determined that a first phase lock loop operation associated with a first clock signal for the first set of processor cores has acquired a first lock signal and a second phase lock loop operation associated with a second clock signal for the second set of processor cores has also acquired a second lock signal, wherein the first clock signal is independent from the second clock signal.

16. The method of claim 15, wherein resuming communications further comprises having determined that a third phase lock loop operation associated with a third set of processor cores in the multi-core processor has acquired a third lock signal, wherein the third set of processor cores is adjacent to the first set of processor cores.

17. The method of claim 16, wherein the second set of processor cores is adjacent to the first set of processor cores.

18. A non-transitory computer-readable medium containing a sequence of instructions to manage communications in a multi-core processor that includes a plurality of processor cores having a first set of processor cores and a second set of processor cores, which when executed by a computing device, causes the computing device to:
   issue a first command to idle communications between the first set of processor cores and the second set of processor cores in response to a clock frequency change request for the first set of processor cores;
   issue a second command to resume communications between the first set of processor cores and the second set of processor cores after having determined that a first phase lock loop operation associated with a first clock signal for the first set of processor cores has acquired a first lock signal and a second phase lock loop operation associated with a second clock signal for the second set of processor cores has also acquired a second lock signal, wherein the first clock signal is independent from the second clock signal.

19. The non-transitory computer-readable medium of claim 18, further including a sequence of instructions, which when executed by the computing device, causes the computing device to determine whether a third phase lock loop operation associated with a third set of processor cores in the multi-core processor has acquired a third lock signal before issuing the second command, wherein the third set of processor cores is adjacent to the first set of processor cores.

20. The non-transitory computer-readable medium of claim 19, wherein the second set of processor cores is adjacent to the first set of processor cores.

21. A multi-core processor, comprising:
   a first set of processor cores of the multi-core processor, wherein each processor core from the first set of processor cores is configured to dynamically receive a first supply voltage from a power control block and a first output clock signal from a first phase lock loop (PLL) having a first clock signal as input in a clock control block;
   a second set of processor cores of the multi-core processor, wherein each processor core from the second set of processor cores is configured to dynamically receive a second supply voltage from the power control block and a second output clock signal from a second PLL having a second clock signal as input in the clock control block, wherein the first supply voltage is independent from the second supply voltage, and the first clock signal is independent from the second clock signal; and
   an interface block coupled to the first set of processor cores and also coupled to the second set of processor cores, wherein the interface block is configured to facilitate communication between the first set of processor cores and the second set of processor cores.

22. The multi-core processor of claim 21, wherein the interface block is configured to idle communications between the first set of processor cores and the second set of processor cores when one or more of the first output clock signal and/or the second output clock signal is determined to have changed.

23. The multi-core processor of claim 22, wherein the interface block is configured to resume communication between the first set of processor cores and the second set of processor cores after one or more of the first output clock signal and/or the second output clock signal is determined to have stabilized.

* * * * *

UNITED STATES PATENT AND TRADEMARK OFFICE
CERTIFICATE OF CORRECTION

PATENT NO. : 8,549,339 B2  
APPLICATION NO. : 12/713220  
DATED : October 1, 2013  
INVENTOR(S) : Wolfe et al.

Page 1 of 1

It is certified that error appears in the above-identified patent and that said Letters Patent is hereby corrected as shown below:

On the Title Page

In Item (56), under "OTHER PUBLICATIONS", in Column 2, Line 1, delete "al" and insert -- al., --, therefor.

In Item (56), under "OTHER PUBLICATIONS", in Column 2, Line 8, delete "al" and insert -- al., --, therefor.

In Item (56), under "OTHER PUBLICATIONS", in Column 2, Line 11, delete "al" and insert -- al., --, therefor.

In Item (56), under "OTHER PUBLICATIONS", in Column 2, Line 15, delete "Howlett-Packard" and insert -- Hewlett-Packard --, therefor.

In the Specifications

In Column 5, Line 61, delete "and or" and insert -- and/or --, therefor.

In the Claims

In Column 9, Line 7, in Claim 15, delete "for managing" and insert -- to manage --, therefor.

Signed and Sealed this  
Sixth Day of May, 2014

Michelle K. Lee  
*Deputy Director of the United States Patent and Trademark Office*